United States Patent
Capers, Jr. et al.

(10) Patent No.: US 7,134,676 B2
(45) Date of Patent: Nov. 14, 2006

(54) SELF-LEVELING WHEELBARROW

(76) Inventors: Seth Murph Capers, Jr., 1717 Broadmoor Dr., Roanoke, TX (US) 76262; Seth Murphy Capers, 18338 Amanda Ln, Saucier, MS (US) 39574

( * ) Notice: Subject to any disclaimer, the term of this patent is extended or adjusted under 35 U.S.C. 154(b) by 241 days.

(21) Appl. No.: 10/769,989

(22) Filed: Feb. 2, 2004

(65) Prior Publication Data

US 2004/0222604 A1 Nov. 11, 2004

Related U.S. Application Data

(60) Provisional application No. 60/443,961, filed on Jan. 31, 2003.

(51) Int. Cl.
*B62B 1/20* (2006.01)

(52) U.S. Cl. .............................. 280/47.31; 280/47.32; 298/3

(58) Field of Classification Search ................ 280/653, 280/47.31, 78, 47.32, 47.3; 298/3
See application file for complete search history.

(56) References Cited

U.S. PATENT DOCUMENTS

| 2,960,182 | A | * | 11/1960 | Swanson | 182/200 |
| 4,243,122 | A | | 1/1981 | Coutts | |
| 4,456,095 | A | * | 6/1984 | Hodson | 182/200 |
| 6,099,025 | A | | 8/2000 | Rohrs | |
| 6,886,838 | B1 | * | 5/2005 | Zimmerman | 280/47.31 |
| 6,991,251 | B1 | * | 1/2006 | Tomchak et al. | 280/653 |
| 2004/0227314 | A1 | * | 11/2004 | Black | 280/47.31 |
| 2005/0012285 | A1 | * | 1/2005 | Davis | 280/47.31 |
| 2005/0218614 | A1 | * | 10/2005 | Black | 280/47.31 |

OTHER PUBLICATIONS

Disclosure of earlier prototype (1992) (see IDS transmittal).

* cited by examiner

*Primary Examiner*—Jeff Restifo
(74) *Attorney, Agent, or Firm*—Laura G. Barrow

(57) ABSTRACT

The inventive wheelbarrow provides novel features that allow the wheelbarrow to remain level on uneven or sloping terrain when parked, thereby providing more stability.

13 Claims, 5 Drawing Sheets

PRIOR ART

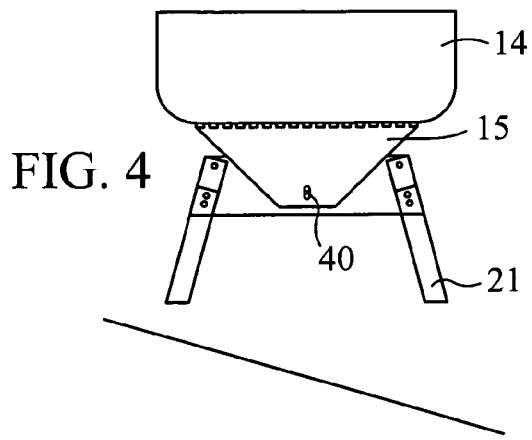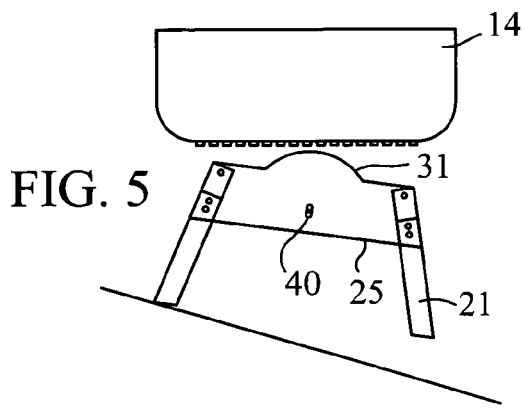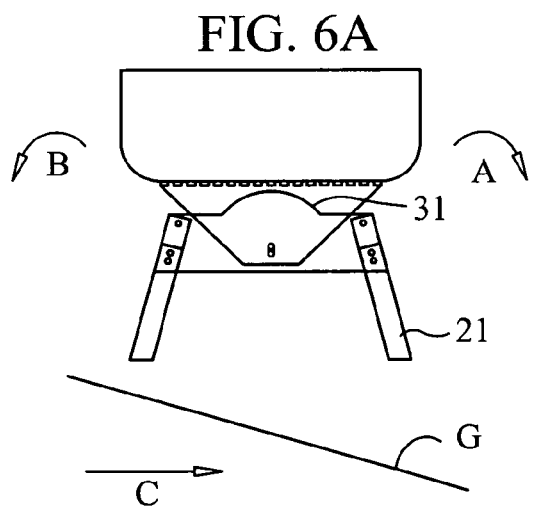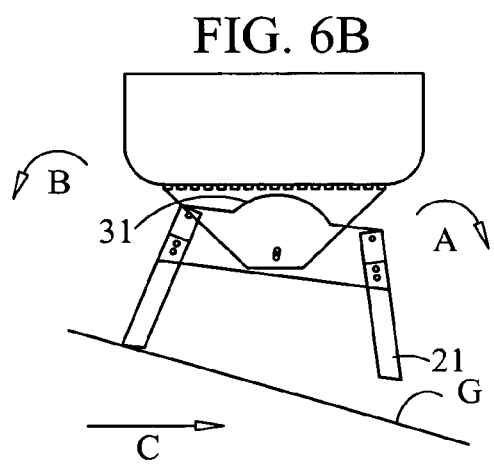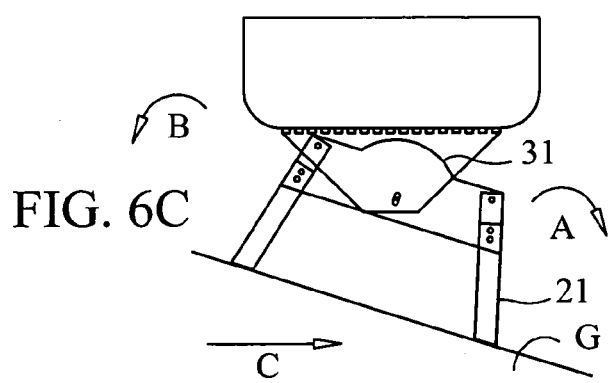

SELF-LEVELING WHEELBARROW

This application claims the benefit of the filing of co-pending U.S. provisional application Ser. No. 60/443,961, filed Jan. 31, 2003, and which is incorporated by reference herein in its entirety.

BACKGROUND AND SUMMARY OF THE INVENTION

The present invention is directed to a novel self-leveling wheelbarrow. The wheelbarrow incorporates self-adjusting legs which conform to the terrain and lock into place when at rest on the ground. The self-leveling feature offers added stability and provides a significant advantage over conventional wheelbarrows when used on sloping or uneven terrain. Several different designs for locking the legs are described herein.

Conventional wheelbarrows are well suited for use on smooth, level surfaces. Their ease of use, excellent mobility, and low cost have made them the material handling equipment of choice for moving small loads in the construction and landscaping industries. As a result of the great success of the conventional wheelbarrow, their basic design has remained essentially unchanged for many years. However, due to its high center of gravity, fixed leg assembly, and the inherent instability of a tripod-style base, the use of a conventional wheelbarrow on uneven or sloped terrain is somewhat restricted. These factors result in a tendency to overturn if the legs are not resting on a level surface. When level ground cannot be found in close proximity to the working area, the worker may be forced to park the wheelbarrow some distance away. The additional walking between the wheelbarrow and the working area during loading or unloading reduces worker productivity. When parked on uneven or sloping terrain, extra care must be taken to avoid overturning and potential injury to the user. As shown in FIG. 1, often a wedge or block X is placed beneath one leg L of the wheelbarrow W in order to provide additional stability and prevent overturning.

The present invention is directed to an improved wheelbarrow that is stable on sloping or uneven ground, the wheelbarrow having features that eliminate its tendency to overturn. Aspects of the present invention incorporate self-adjusting mechanisms added to the leg assembly which consequently allow the legs to conform to the terrain as the wheelbarrow is lowered and locked into position when both legs are in contact with the resting surface. The self-leveling action increases stability and maintains the wheelbarrow, in particular the basin, in a level position. The center of gravity remains very nearly centered above the midpoint of the legs, thus the weight is more evenly distributed between the legs, and the tendency to overturn is diminished.

In certain aspects, the present invention comprises a self-leveling wheelbarrow having a basin, a wheel disposed beneath the basin near the basin's front end, and a handle assembly secured to the basin. The wheelbarrow further includes a rear mounting bracket secured near the rear end of the basin, the mounting bracket having a top end secured beneath the basin, mounting bracket further having a vertical slot communicating therethrough. The leg assembly of the wheelbarrow includes a pair of legs secured to one another by a centrally disposed plate, such that the one leg is positioned beneath the right side of the basin and the other leg is positioned beneath the left side of the basin. The centrally disposed plate includes a top edge. A pin extends from the plate and is slidably engaged within the slot to allow the leg assembly to move vertically within the slot and to rotate in a clockwise and counterclockwise direction about the pin. The wheelbarrow further includes a locking assembly secured beneath the basin in vertical alignment with the top edge of the leg assembly plate. The locking assembly is configured to engage the top edge of the leg assembly plate when the legs are in contact with underlying terrain. In one embodiment, the locking assembly further includes a first pair of opposing cam devices, each of the cam devices having an eccentrically fixed pivot end about which the cam device may rotate, and a free end having an outer edge, each of the cam devices spaced a distance apart to create a channel between the outer edges. This channel extends in horizontal alignment with the top edge of the leg assembly plate and is configured to engage the top edge therein. In operation, as the legs of the leg assembly contact the underlying ground as the wheelbarrow is parked upon the terrain, the leg assembly rotates about the pin within the slot to accommodate the contour angle of the terrain, sliding the top edge of the plate within the locking assembly channel in friction-fit contact with the outer edges of the opposing cam devices. This action consequently locks the plate therebetween to prevent the leg assembly from rotating further about the pin the direction of travel (i.e. either in a clockwise or a counterclockwise direction of travel). In addition, the locking assembly may include a second pair of cam devices positioned adjacent to the first pair of cam devices to prevent rotation in both the clockwise and counterclockwise directions simultaneously.

Other aspects of the inventive wheelbarrow include different locking assemblies, including one or two locking bars secured beneath the basin and aligned above the top edge of the leg assembly plate when the leg assembly is in contact with the ground surface. The locking bar(s) has an eccentrically fixed pivot end about which the bar may rotate and a free end having a horizontal slot in alignment with the top edge of the leg assembly plate and configured to engage the top edge of the plate therein. As the leg assembly contacts the underlying ground and the leg assembly rotates about the pin to accommodate the contour of the ground, the top edge of the plate slides within the slot in friction-fit contact therein, thereby locking the plate therein to prevent the leg assembly from rotating further about the pin in either a clockwise or counterclockwise direction of travel.

Another embodiment of the locking assembly includes a disk brake locking assembly having a pair of disk brake pads aligned on each side of the leg assembly plate, such that upon activation of the locking assembly by a brake lever, the pads squeeze toward one another to engage the plate therebetween.

Other features of the inventive wheelbarrow include the pin extending from the mounting bracket instead of the leg assembly plate, with the vertical slot communicating through the leg assembly plate, as opposed to the mounting bracket.

Moreover, the leg assembly may include, in a series, a rear vertical member to which the rear plate is secured, a horizontal portion integral with the vertical member and adapted to contact the ground, and a front member integral with the horizontal member and terminating into a front plate, the front plate in alignment with a front mounting bracket and secured beneath the wheelbarrow in registration with the rear mounting bracket. In this embodiment, the pin comprises an elongated rod extending from the front mounting bracket, front leg assembly plate, through the vertical slot in the rear leg assembly plate, and secured to the rear mounting bracket. Alternatively, the vertical slot may be located in the rear mounting bracket.

DESCRIPTION OF THE FIGURES

FIG. 4 is a rear view of the inventive wheelbarrow (handle and wheel removed for ease of illustration) showing the vertical slot disposed on the rear mounting bracket.

FIG. 5 is a rear view of the inventive wheelbarrow shown in FIG. 4, with the rear mounting bracket removed to show the vertical slot incorporated in the centrally disposed plate of the rear leg assembly.

FIGS. 6A–6C are rear views of the inventive wheelbarrow illustrated in FIG. 4, showing the rotation of the leg assembly relative to the mounting bracket, basin, and terrain as the wheelbarrow is being parked.

DESCRIPTION OF THE EMBODIMENTS

Figure 1:
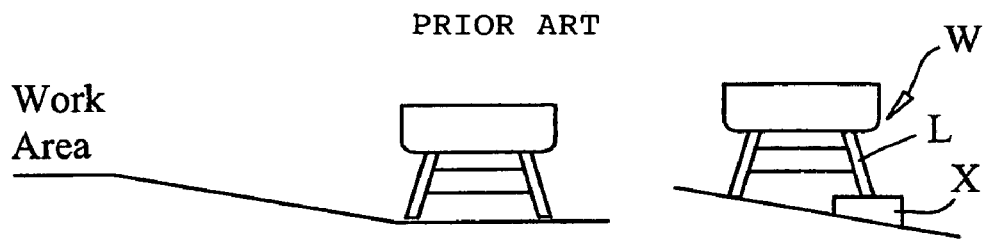
FIG. 1 is a schematic illustration of a conventional wheelbarrow parked on sloping terrain.
Figure 2:
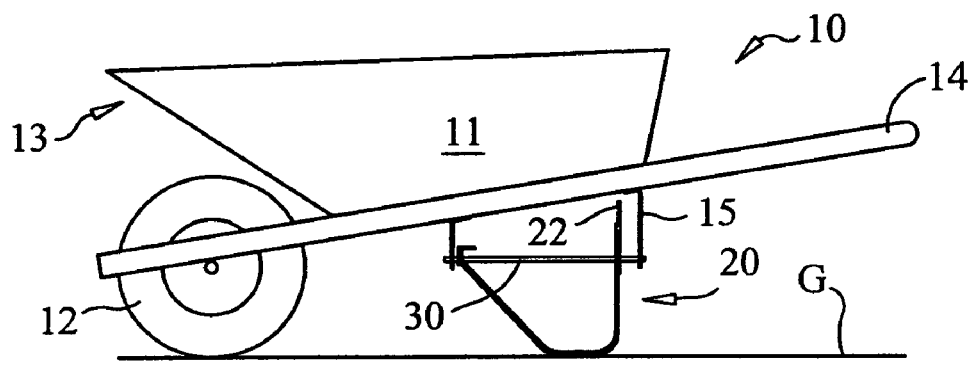
FIG. 2 is a side view of the inventive wheelbarrow, with the specific locking assembly not shown for ease of illustration.
Figure 3:
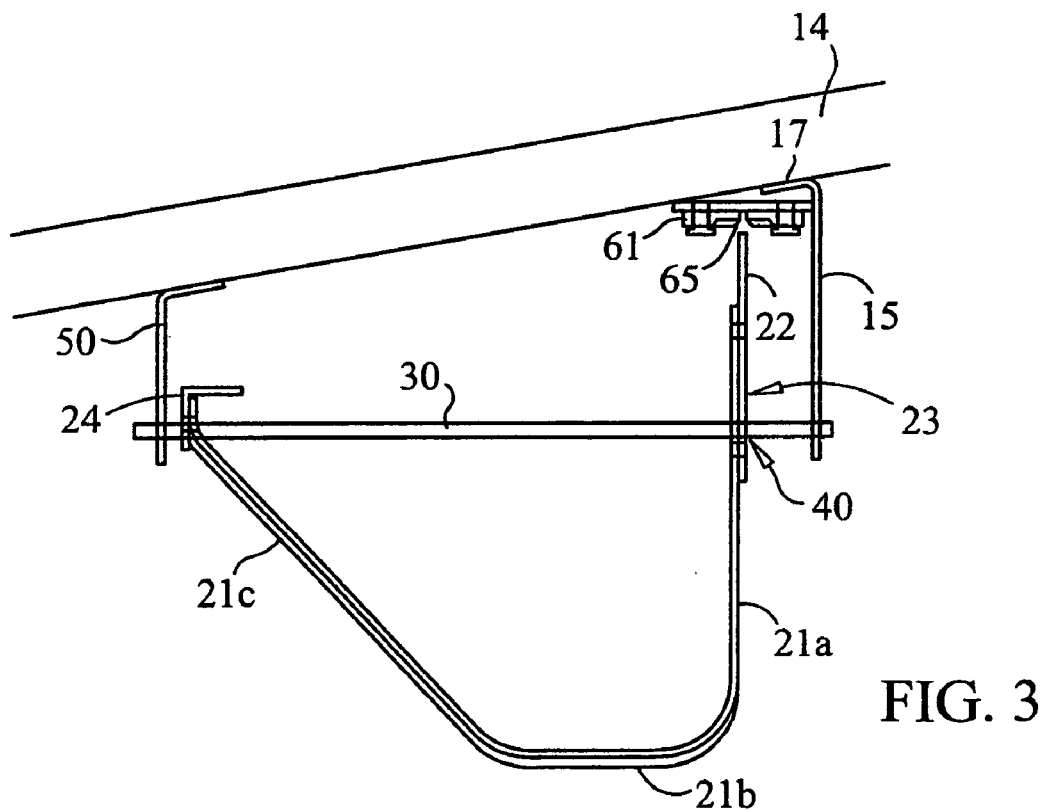
FIG. 3 is an partial enlarged view of the inventive wheelbarrow, further illustrating one embodiment of the inventive locking assembly.

The present invention is directed to novel self-leveling wheelbarrows that may be stabilized in a locked position when parked on sloping or uneven terrain. Referring now to FIGS. 2–3, one embodiment of the inventive wheelbarrow 10 comprises a basin 11, a wheel disposed 12 beneath the front end 13 of the basin, and a handle assembly 14 secured to the basin. The wheelbarrow further comprises a rear mounting bracket 15 secured near the rear end of the basin. The mounting bracket may be L-shaped as illustrated in FIGS. 2–3, for example, with the top end 17 secured directly to the bottom of the basin or onto the handles 14. The wheelbarrow further includes a leg assembly 20 having a pair of legs 21 secured to one another by a centrally disposed plate 22. As illustrated, the basin is centrally disposed between the two legs 21. Extending from the plate's rear surface 23 is a pin 30, the pin being slidably engaged within a vertical slot 40 communicating through the mounting bracket described above (see FIG. 4). The leg assembly plate and the mounting bracket are aligned such that the pin is slidably engaged within the vertical slot, thereby allowing the leg assembly to move vertically within the slot as well as rotate in a clockwise A and counterclockwise B direction about the pin. Consequently, with this design, the leg assembly is free to pivot when the wheelbarrow is lifted, and thus rotate to match the contour of the underlying ground when the wheelbarrow is parked. FIGS. 6A–C illustrate the rotation (clockwise A or counterclockwise B) of the leg assembly relative to the mounting bracket, basin, and underlying ground or terrain G, with further reference to the direction of travel C.

FIGS. 2–3 illustrate a preferred embodiment of the present invention wherein the wheelbarrow further includes a front mounting bracket 50 secured beneath the basin. The front mounting bracket is in registration with the rear mounting bracket. Each of the legs of the leg assembly include, in a series, a rear vertical member 21a to which the plate 22 is secured, a horizontal portion 21b integral with the rear vertical member 21a and adapted to contact the underlying terrain or ground G, and a front member 21c integral with the horizontal member 21b and terminating into a front plate 24. The front plate 24 is in alignment with the front mounting bracket 50 and may be integral with the front leg member 21c or secured thereto. In this embodiment, the pin 30 is an elongated rod that extends through bores (not shown) communicating through the front mounting bracket 50, the front leg assembly plate 24, and the rear leg assembly plate 22. The pin further extends into the vertical slot 40 of the rear mounting bracket 15 for pivotal movement therein, as described above. Preferably, the pin is fixedly secured to the front and rear leg assembly plates by means of a self-locking nut (not shown) or similar fastening means, for example, but is movably engaged within the front 50 and rear 15 mounting brackets.

Alternatively, the vertical slot 40 described above may be located within the rear leg assembly plate 22, preferably near the bottom edge 25 of the plate, with the pin fixedly extending from the rear mounting bracket 15 of the wheelbarrow. This latter embodiment is best illustrated in FIG. 5, where the rear mounting bracket has been removed for ease of illustration and can be compared to the embodiment shown in FIG. 4, for example, wherein the vertical slot 40 is disposed through the rear mounting bracket 15. In this latter embodiment (i.e. as shown in FIG. 5), the leg assembly 20 can move freely vertically about the pin within the slot and can also rotate or pivot freely in both clockwise A and counterclockwise B directions about the pin. This embodiment may further include a similar leg assembly as described above and illustrated in FIGS. 2–3, wherein both legs of the leg assembly terminate into a front plate 24, which in turn is secured to a front mounting bracket by an elongated pin. In this embodiment, the elongated pin is fixedly secured to the front 50 and rear 15 mounting brackets, such that the leg assembly can freely pivot about the pin via the vertical slot communicating through the rear leg assembly plate 22.

Figure 7:
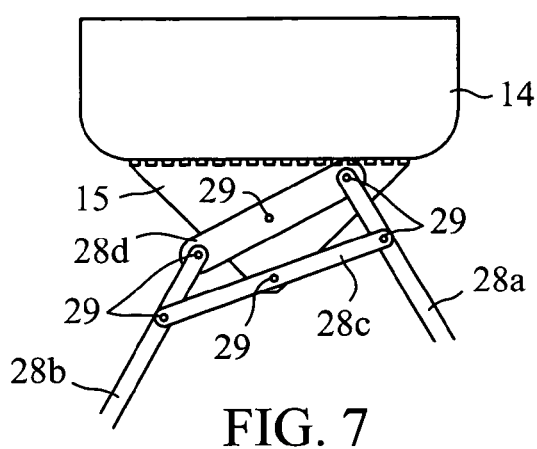
FIG. 7 is a rear view of the wheelbarrow having an alternative leg assembly design.
Figure 8:
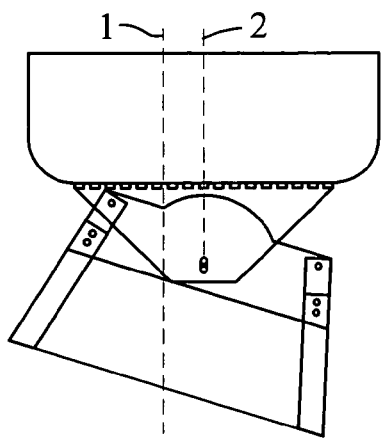
FIG. 8 is the embodiment shown in FIG. 4, including a reference to the center lines with respect to the basin and leg assembly.
Figure 9:
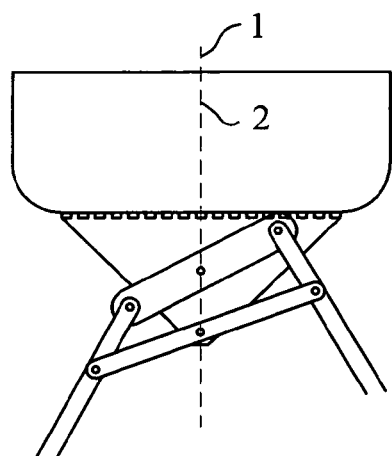
FIG. 9 is the embodiment shown in FIG. 7, including a reference to the center lines with respect to the basin and leg assembly.
Figure 10:
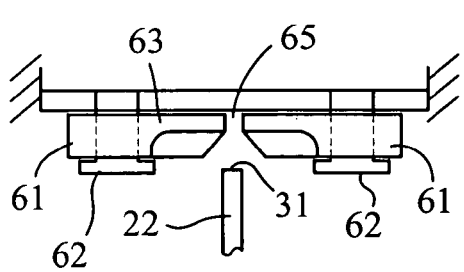
FIG. 10 is an enlarged, partial side view of the first embodiment of the locking assembly in a disengaged position.
Figure 11:
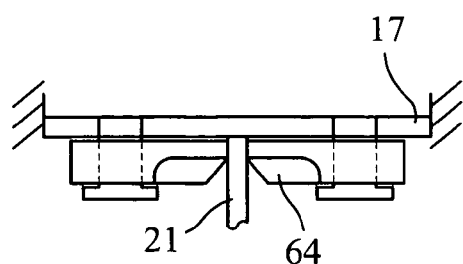
FIG. 11 is an enlarged, partial side view of the first embodiment of the locking assembly illustrated in FIG. 10, but in an engaged position.
Figure 12:
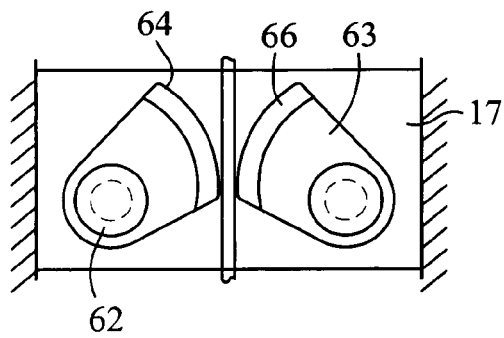
FIG. 12 is a bottom view FIG. 10.
Figure 13:
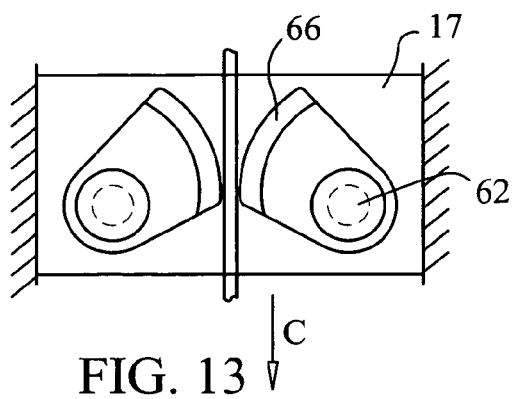
FIG. 13 is a bottom view of FIG. 11.

The leg assemblies just described comprise a pair of substantially vertical or slightly angled legs 21 that are fixed in position with respect to one another. Here, both legs follow a circular path and are fixed relative to each other. As the leg assembly 20 rotates beneath the wheelbarrow, the legs shift in the same direction. As a result, there is a shift between the leg assembly centerline 1 and the centerline 2 of the wheelbarrow basin 11, as shown in FIG. 8. Alternatively, the leg assembly may be designed as illustrated in FIGS. 7 and 9, utilizing a four-bar linkage comprising leg segments 28a–d. By using an appropriately designed four bar linkage, the legs can be designed to move in essentially a vertical direction instead of rotating via pins 29 connecting the segments 28a–d to one another. This results in an almost constant leg position relative to the wheelbarrow body's centerline 2, as shown in FIG. 9.

Regardless of the location of the pin 30 and vertical slot 40, or the configuration of the fixed leg assembly 21, as described in detail above, the inventive wheelbarrow further includes a locking assembly secured beneath the basin. The function of the locking assembly is to lock the leg assembly 21 in place relative to the basin 11 when the wheelbarrow is stationary (i.e. parked). The locking assembly may be secured directly to the bottom of the basin (not shown) or more preferably secured to the top end 17 of the rear mounting bracket 15. Preferably, the locking assembly is aligned above the top edge 31 of the rear leg assembly plate 22.

In one embodiment, the locking assembly comprises a pair of opposing cam devices 61, as shown in FIGS. 3 and 10–13. Each of the cam devices has an eccentrically fixed pivot end 62 about which the cam device may rotate. Each of the cam devices further has a free end 63 with an outer edge 64, the free end adapted to rotate clockwise or counterclockwise about the pivot end. The two cam devices are spaced apart to form a channel 65 therebetween. The channel extends in horizontal alignment with the top edge 31 of the leg assembly plate and is sufficiently wide to securely engage the top edge 31 of the rear leg assembly plate 22. In operation, as the leg assembly of the wheelbarrow contacts the underlying ground G, the leg assembly rotates about the pin within the slot to accommodate the contour angle of the ground. As the leg assembly rests upon the ground, the locking assembly moves downward such that the top edge of the plate slides into the channel 65 between the cam devices for engagement therein. A friction-fit contact is achieved between the outer surfaces of the plate 22 and the outer edges 64 of each of the cam devices. Friction between the outer edges of the cam devices and the leg assembly plate cause the cam device to attempt to rotate in the direction of travel C of the leg assembly. The locking assembly is designed such that the resulting increase in friction prevents further rotation of the leg assembly, either clockwise A or counterclockwise B, depending upon the direction of travel C. In a preferred embodiment, the outer edges of the cam devices have a chamfered lead-in 66 to facilitate entry of the plate therein. Moreover, the top edge 31 of the leg assembly plate preferably has a smooth arcuate configuration, with its center in line with the pivot point, as illustrated, thereby providing an infinite number of parking positions see, for example, FIGS. 5–6). The center of the arcuate surface is aligned with the center of the pivot point, the latter corresponding to the combination pin and vertical slot.

Figure 14:
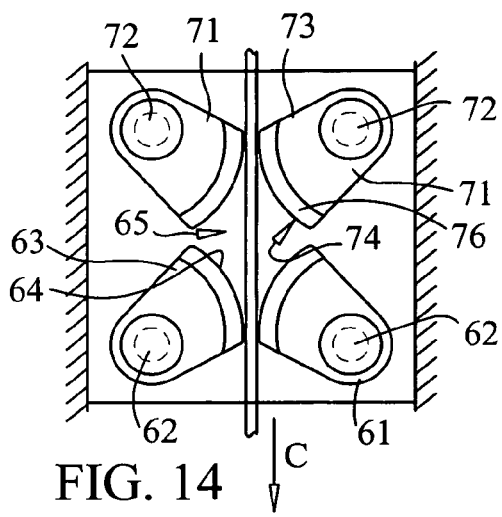
FIG. 14 is a bottom view of a second embodiment of the locking assembly.

For increased stability, the locking assembly may include a second pair of cam devices 71 positioned adjacent to the first pair of cam devices, as illustrated in part in FIG. 14. As described above, each of cam devices in both pairs of cam devices include an eccentrically fixed pivot end 72 and a free end 73 having an outer edge 74. Each of the second pair of cam devices are spaced an equal distance apart as the first pair described above to create the channel 65 between the outer edges 64, 74 of the cam devices. As discussed above for the first pair of cam devices 61, the outer edges 74 of the second pair of cam devices may have a chamfered lead-in 76 to facilitate engagement therebetween. In operation, when the top edge 31 of the rear leg assembly plate 22 is engaged within the channel between both pairs of cam devices, friction between the outer edges 64, 74 of the cam devices and the rear leg assembly plate cause the cam devices to attempt to rotate in the direction of travel C of the leg assembly. The locking assembly is designed such that the resulting increase in friction prevents further rotation of the leg assembly in not only the direction of travel C, but also in the opposite direction of travel (i.e. both clockwise A and counterclockwise B directions).

Figure 15:
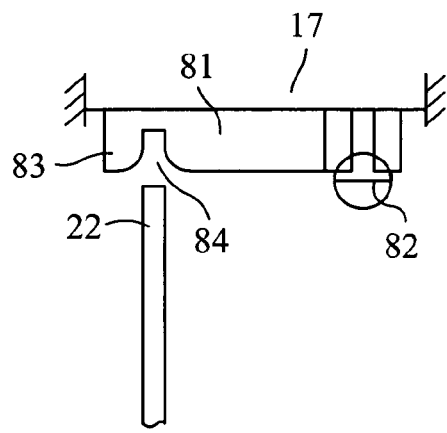
FIG. 15 is an enlarged, partial side view of a third embodiment of the locking assembly in a disengaged position.
Figure 16:
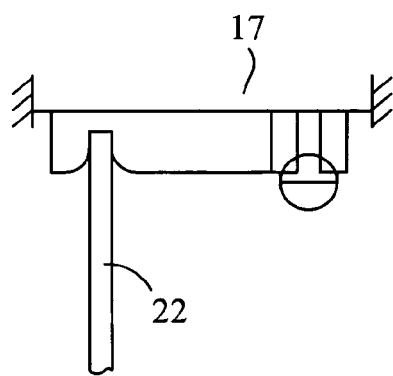
FIG. 16 is an enlarged, partial side view of the third embodiment of the locking assembly illustrated in FIG. 15, but in an engaged position.
Figure 17:
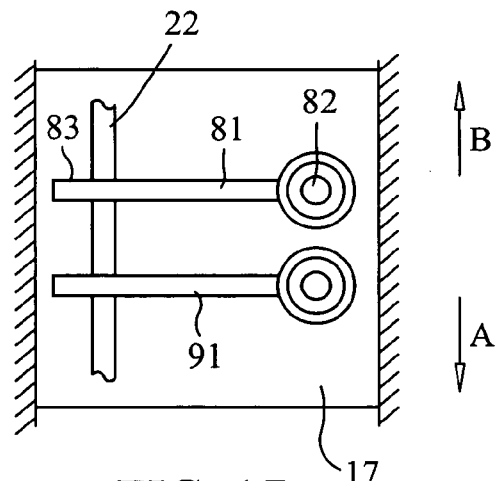
FIG. 17 is a bottom view of a fourth embodiment of the locking assembly.

An alternative locking assembly design is illustrated in FIGS. 15–16 Here, the locking assembly includes a dual acting, self-actuating locking bar 81 having an eccentrically fixed pivot end 82 about which the bar may rotate. The locking bar is secured beneath the basin, either directly to the basin or more preferably to the top end 17 of the rear mounting bracket 15, again, depending upon the configuration of the rear mounting bracket 15, as described above for the cam device locking assembly embodiment 61. The locking bar also includes a free end 83 having a horizontal slot 84 which is in alignment with the top edge 31 of the rear plate 22 of the leg assembly. In operation, when the leg assembly contacts the underlying ground G as the wheelbarrow is parked and the leg assembly is rotated to accommodate the contour angle of the ground, the top edge 31 of the rear leg assembly plate is engaged within the slot 84 of the locking bar. As with the cam device locking assembly embodiment, as discussed above, the top edge 31 of the rear leg assembly preferably has a smooth arcuate configuration in line with the center pivot point of the plate. The locking assembly is designed such that the resulting increase in friction prevents further rotation of the leg assembly in the direction of travel C. Optionally, the locking assembly may comprise a second locking bar 91 designed similarly or identical to the first locking bar just described, the tow bars 81, 91 positioned in opposing directions to prevent rotation of the leg assembly in either direction (i.e. clockwise A or counterclockwise B), as illustrated in FIG. 17. In this latter embodiment, the two locking bars 81, 91 are aligned adjacent to one another such that the two slots are in registration with one another and configured to engage the top edge 31 of the rear leg assembly plate 22. Once engaged within the slots, the plate is prevented from rotating further in the direction of travel C. Moreover, the plate is further prevented from moving in the opposite direction of travel, by virtue of the second locking bar 91.

Figure 18:
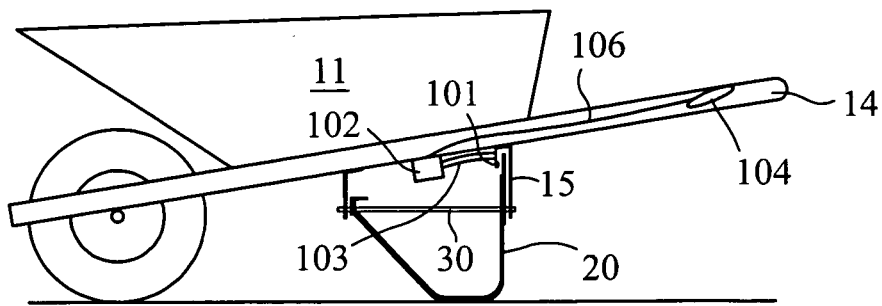
FIG. 18 is a side view of the inventive wheelbarrow, including a schematic representation of a fifth embodiment of the locking assembly.
Figure 19:
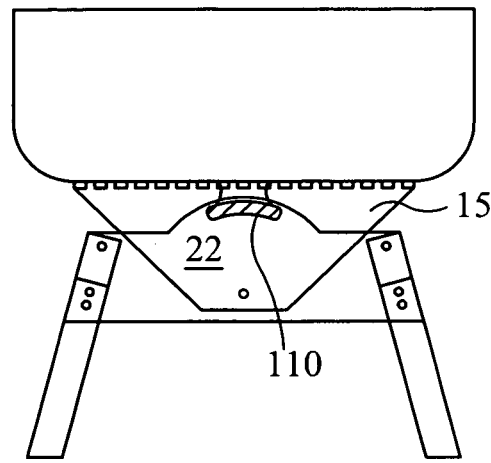
FIG. 19 is a rear view of the inventive wheelbarrow incorporating a partial schematic representation of the fifth embodiment of the locking assembly (handles and wheel removed for ease of illustration).
Figure 20:
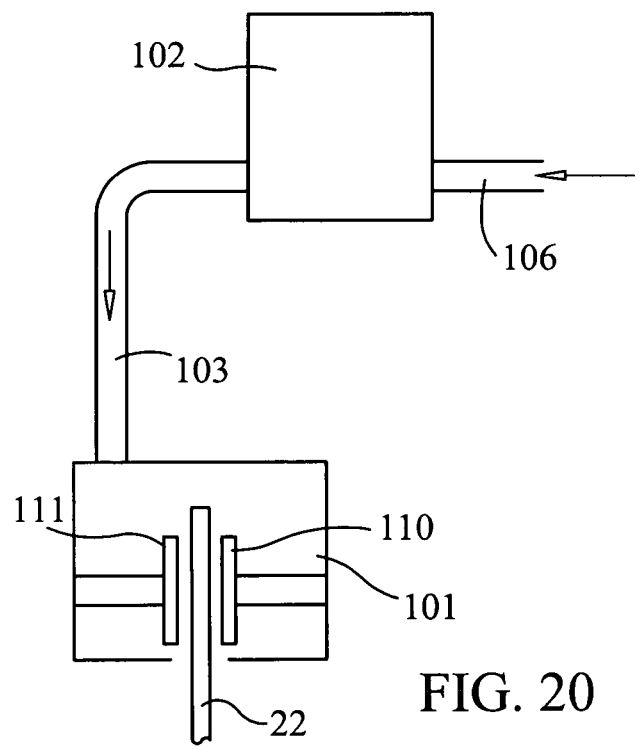
FIG. 20 is an enlarged partial schematic illustration of the fifth embodiment of the locking assembly.

The present invention is also directed to a third locking assembly embodiment comprising a disk brake system. FIGS. 18–20 provide schematic illustrations of this locking device. Unlike the two locking assembly embodiments described above (i.e. the cam device and locking bar device), the inventive wheelbarrow incorporating the disk brake locking device does not require the employment of a vertical slot 40 in either the rear leg assembly plate or the rear mounting bracket. In this embodiment, the rear mounting bracket is secured beneath the basin and is aligned with the rear leg assembly plate. A pin 30 extends from either the rear leg assembly plate or the mounting bracket and is rotatably secured to one or the other to allow the leg assembly to rotate clockwise or counterclockwise, as described for the earlier embodiments, in order to accommodate the contour of the underlying ground when the wheelbarrow is parked. Unlike the other locking assembly embodiments, however, the leg assembly 20 does not need to move up and down in order to achieve a locked positioned, as described in more detail below.

The disk brake locking assembly includes a caliper unit 101 secured beneath the basin in alignment with the top edge 31 of the rear leg assembly plate 22. An energy supply unit 102 is secured to the wheelbarrow for operating the locking assembly, the energy supply unit being a conventional device used in other disk brake systems and including hydraulic brake fluid (not shown). The assembly further includes a transmission hose 103 connecting the energy supply unit 102 to the caliper unit 101 and is adapted to transmit hydraulic brake fluid from the energy supply unit to the caliper unit. A brake lever 104 may be conveniently located on a handle 14 of the wheelbarrow and is in communication, via a cable means 106, for example, with the energy supply unit 102 to activate it. The caliper unit 101 comprises a pair of disk brake pads 110, 111, positioned such that the rear leg assembly plate is disposed between each pad. Operation of the disk brake locking system is the same as any other conventional disk brake locking system in that upon actuation of the brake lever, the energy supply unit is activated to transmit hydraulic brake fluid to the caliper unit. The fluid causes the disk brake pads to squeeze together, thereby engaging the plate 22 therebetween and locking it into place. Thus, when parking the wheelbarrow, as the leg assembly contacts the underlying ground G, the leg assembly is allowed to rotate about the pin to accommodate the contour of the underlying ground. The rear leg assembly plate simultaneously rotates between the disk brake pads. When the wheelbarrow is parked at the desired position as just described, the operator of the wheelbarrow squeezes or activates the lever to cause the disk brakes to engage the plate therebetween, thereby preventing further movement of the leg assembly in either direction until the disk brake pads 110, 111 are disengaged via brake lever 104.

It will be recognized by the skilled artisan that FIGS. 18–20 are merely schematic representations of a conventional disk brake system, and thus modifications in the design placement of the lever 104, cables 106, energy supply unit 102, and transmission hose 103 may be made as desired.

The foregoing description is with respect to a complete wheelbarrow design, comprising conventional basins, handles, and wheels in addition to the inventive locking assembly and leg assembly designs. However, it is also contemplated that the present invention may be designed as a retrofit kit for adaptation to existing conventional wheelbarrows. Such a kit comprises all the components of the inventive self-leveling wheelbarrow, namely the rear mounting bracket and, if desired, a front mounting bracket, plates for attachment to the existing leg assembly of the wheelbarrow, pins, and the desired locking assembly. Such a kit would also include a means for adjusting the mounting brackets and leg span to accommodate the variations in mounting locations among wheelbarrows vended by different manufacturers.

It will be appreciated by those of ordinary skill in the art that the configuration and type of the wheelbarrow, wheel, and handle assembly may be varied as desired without departing from the scope and spirit of the present invention. Moreover, variations in configuration, size, and positioning of the mounting brackets, pin, and leg assembly, including the leg assembly plate, may also be made and are within the scope of the invention, provided the self-leveling and locking features are maintained.

The invention claimed is:

1. A self-leveling wheelbarrow comprising:
   a. a basin having a front end, a rear end, a left side and a right side;
   b. a wheel disposed beneath said basin near said front end;
   c. a rear mounting bracket secured near said rear end of said basin, said mounting bracket having a top end secured beneath said basin and a bottom end, said mounting bracket further having a vertical slot communicating therethrough;
   d. a leg assembly, said leg assembly comprising a pair of legs secured to one another by a centrally disposed plate, such that one of said pair of legs is positioned beneath said right side of said basin and the other one of said pair of legs is positioned beneath said left side of said basin, said plate further having a top edge;
   e. a pin extending from said plate, said pin slidably engaged within said slot to allow said leg assembly to move vertically within said slot and to rotate in a clockwise and counterclockwise direction about said pin; and
   f. a locking assembly secured beneath said basin in vertical alignment with said top edge of said leg assembly plate, said locking assembly configured to engage said top edge of said leg assembly plate when said leg assembly is in contact with a ground surface, said locking assembly comprising a first bar having an eccentrically fixed pivot end about which said bar may rotate, and a free end having a horizontal slot in alignment with said top edge of said leg assembly plate and configured to engage said top edge therein;
   whereby as said leg assembly contacts the underlying ground as the wheelbarrow is parked, said leg assembly rotates about said pin within said slot to accommodate the contour angle of the ground, sliding said top edge of said plate within said first bar slot in friction-fit contact therein, thereby locking said plate therein to prevent said leg assembly from rotating further about said pin, either in a clockwise direction of travel or a counterclockwise direction of travel.

2. The wheelbarrow of claim 1, wherein said top edge of said leg assembly plate has a smooth arcuate configuration.

3. The wheelbarrow of claim 1, wherein said locking assembly is secured to said top end of said mounting bracket.

4. The wheelbarrow of claim 1, wherein said locking assembly comprises a second bar aligned adjacent to said first bar, said second bar having an eccentrically fixed pivot end about which said second bar may rotate and a free end having a horizontal slot in alignment with said top edge of said leg assembly plate and configured to engage said top edge therein, wherein said second bar slot is in registration with said first bar slot, such that when said top edge of said leg assembly plate is engaged within said first and second slots simultaneously, said first and second bars, in combination, prevent said leg assembly from rotating in both clockwise and counterclockwise directions, regardless of said direction of travel.

5. The wheelbarrow of claim 1, further including:
   a. a front mounting bracket secured beneath said basin in registration with said rear mounting bracket;

b. each of said legs of said leg assembly including a rear vertical member to which said plate is secured, a horizontal portion integral with said rear vertical member and adapted to contact said ground, and a front member integral with said horizontal member and terminating into a front plate, said front plate in alignment with said front mounting bracket; and c. wherein said pin is an elongated rod extending through said front mounting bracket, said front leg assembly plate, said rear leg assembly plate, and through said rear mounting bracket slot, said pin engaged within said front mounting bracket and secured to said front leg assembly plate and said rear leg assembly plate.

6. The wheelbarrow of claim 5, wherein said locking assembly comprises a second bar aligned adjacent to said first bar, said second bar having an eccentrically fixed pivot end about which said second bar may rotate and a free end having a horizontal slot in alignment with said top edge of said leg assembly plate and configured to engage said top edge therein, wherein said second bar slot is in registration with said first bar slot, such that when said top edge of said leg assembly plate is engaged within said first and second slots simultaneously, said first and second bars, in combination, prevent said leg assembly from rotating in both clockwise and counterclockwise directions, regardless of said direction of travel.

7. A self-leveling wheelbarrow comprising:
a. a basin having a front end, a rear end, a left side and a right side;
b. a wheel disposed beneath said basin near said front end;
c. a rear mounting bracket secured near said rear end of said basin, said mounting bracket having a top end secured beneath said basin;
d. a leg assembly, said leg assembly comprising a pair of legs secured to one another by a centrally disposed plate, such that one of said pair of legs is positioned beneath said right side of said basin and the other one of said pair of legs is positioned beneath said left side of said basin, said plate having a top edge, a bottom edge, and a vertical slot communicating therethrough;
e. a pin extending from said mounting bracket, said pin slidably engaged within said slot to allow said leg assembly to move vertically within said slot and to rotate in a clockwise and counterclockwise direction about said pin; and
f. a locking assembly secured beneath said basin in vertical alignment with said top edge of said leg assembly plate, said locking assembly configured to engage said top edge of said leg assembly plate when said leg assembly is in contact with a ground surface, said locking assembly comprising a first bar having an eccentrically fixed pivot end about which said bar may rotate, and a free end having a horizontal slot in alignment with said top edge of said leg assembly plate and configured to engage said top edge therein;
whereby as said leg assembly contacts the underlying ground as the wheelbarrow is parked, said leg assembly rotates about said pin within said slot to accommodate the contour angle of the ground, sliding said top edge of said plate within said first bar slot in friction-fit contact therein, thereby locking said plate therein to prevent said leg assembly from rotating further about said pin, either in a clockwise direction of travel or a counterclockwise direction of travel.

8. The wheelbarrow of claim 7, wherein said top edge of said leg assembly plate has a smooth arcuate configuration.

9. The wheelbarrow of claim 7, wherein said locking assembly is secured to said top end of said mounting bracket.

10. The wheelbarrow of claim 7, wherein said locking assembly comprises a second bar aligned adjacent to said first bar, said second bar having an eccentrically fixed pivot end about which said second bar may rotate and a free end having a horizontal slot in alignment with said top edge of said leg assembly plate and configured to engage said top edge therein, wherein said second bar slot is in registration with said first bar slot, such that when said top edge of said leg assembly plate is engaged within said first and second slots simultaneously, said first and second bars, in combination, prevent said leg assembly from rotating in both clockwise and counterclockwise directions, regardless of said direction of travel.

11. The wheelbarrow of claim 10, wherein said top edge of said leg assembly plate has a smooth arcuate configuration.

12. The wheelbarrow of claim 10, wherein said locking assembly is secured to said top end of said mounting bracket.

13. The wheelbarrow of claim 7, further including
a. a front mounting bracket secured beneath said basin in registration with said rear mounting bracket;
b. each of said legs of said leg assembly including a rear vertical member to which said plate is secured, a horizontal portion integral with said rear vertical member and adapted to contact said ground, and a front member integral with said horizontal member and terminating into a front plate, said front plate in alignment with said front mounting bracket; and
c. wherein said pin is an elongated rod extending from said front mounting bracket, said front leg assembly plate, through said slot in said rear leg assembly plate, and secured to said rear mounting bracket.

* * * * *